W. A. WOODESON.
MEANS FOR DISTRIBUTING ACTUATING FLUID IN ENGINES.
APPLICATION FILED OCT. 11, 1917.
1,301,025.
Patented Apr. 15, 1919.
5 SHEETS—SHEET 3.
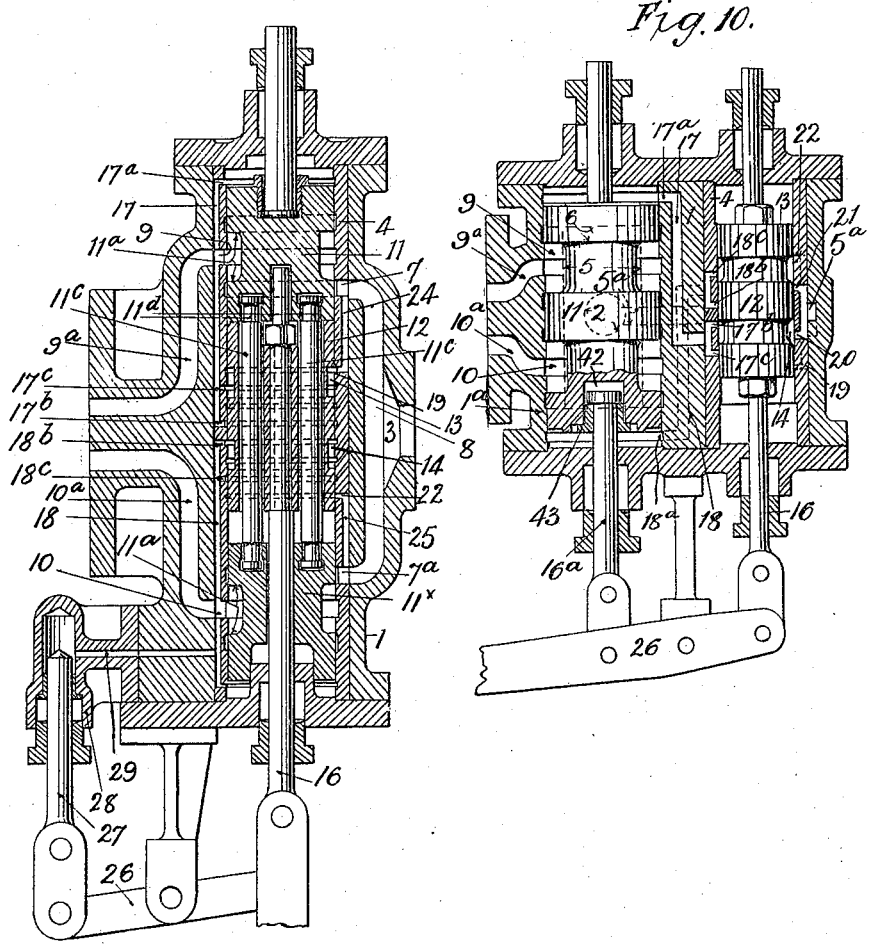

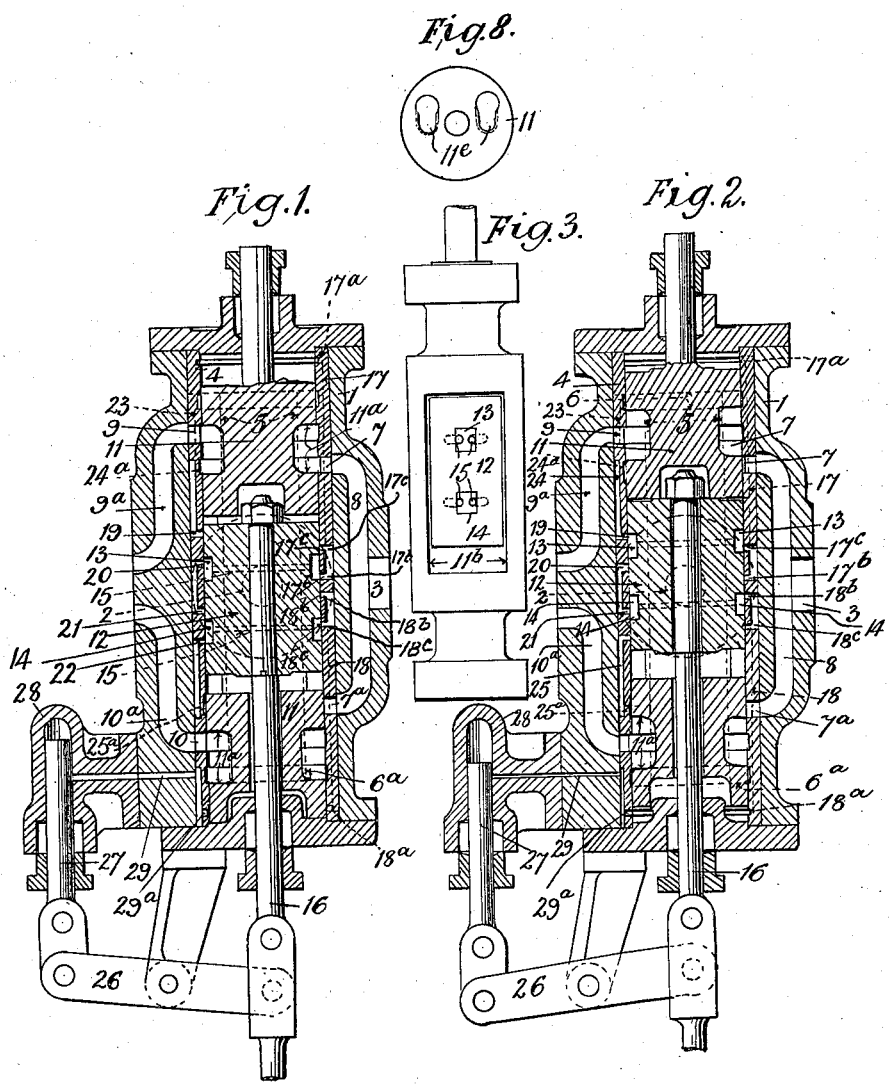

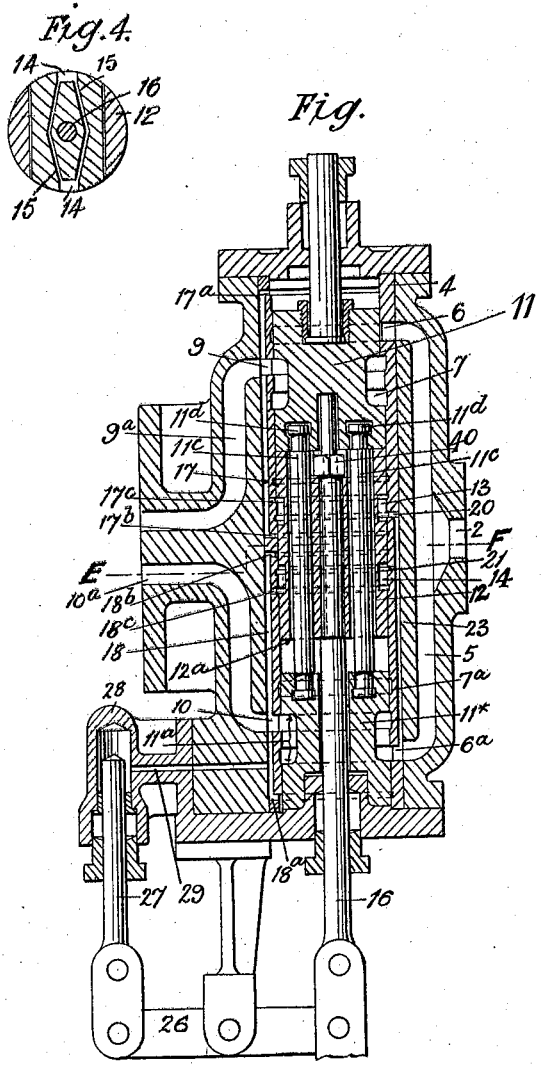

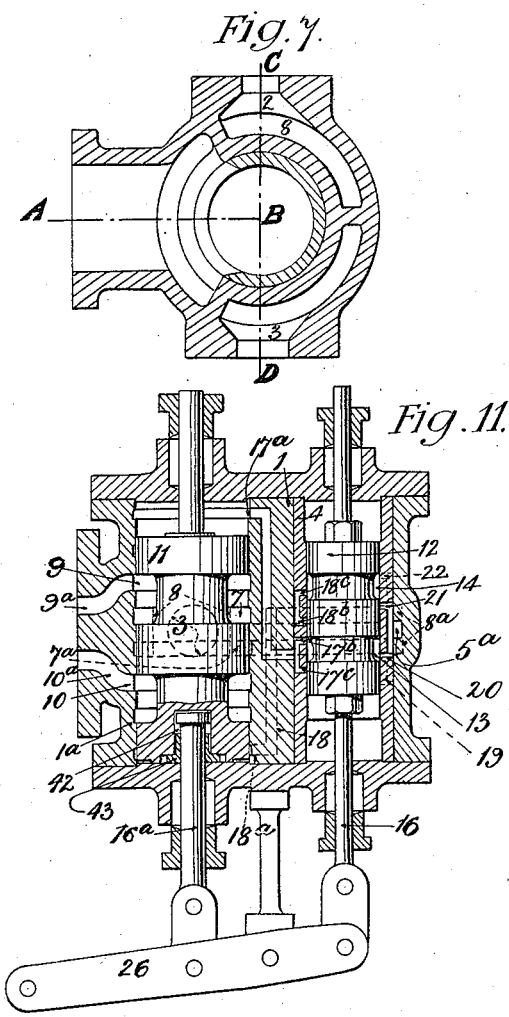

W. A. WOODESON.
MEANS FOR DISTRIBUTING ACTUATING FLUID IN ENGINES.
APPLICATION FILED OCT. 11, 1917.
1,301,025.
Patented Apr. 15, 1919.
5 SHEETS—SHEET 5.
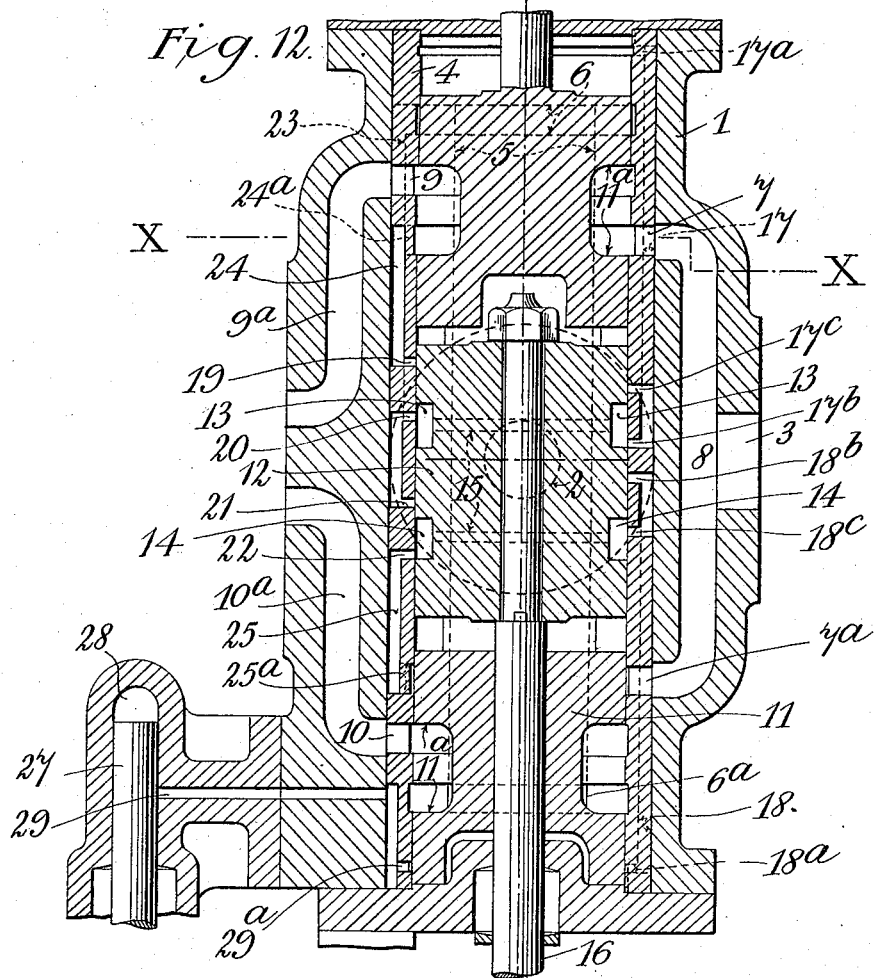
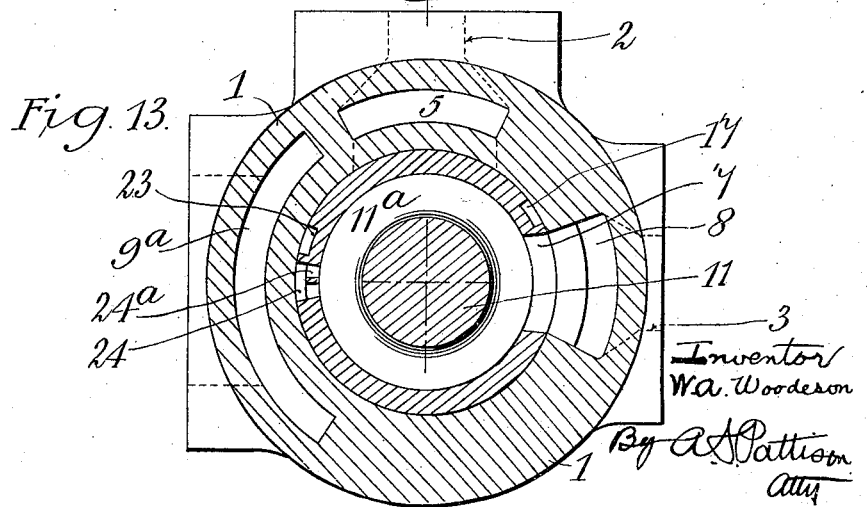

UNITED STATES PATENT OFFICE.

WILLIAM ARMSTRONG WOODESON, OF GATESHEAD, ENGLAND.

MEANS FOR DISTRIBUTING ACTUATING FLUID IN ENGINES.

1,301,025.   Specification of Letters Patent.   Patented Apr. 15, 1919.

Application filed October 11, 1917. Serial No. 196,019.

*To all whom it may concern:*

Be it known that I, WILLIAM ARMSTRONG WOODESON, a subject of the King of Great Britain and Ireland, residing at Gateshead-on-Tyne, in the county of Durham, England, have invented Improvements in Means for Distributing Actuating Fluid in Engines, of which the following is a specification.

This invention has reference to improvements in means for distributing actuating fluid (hereinafter referred to as steam) to engines of the kind comprising a main distributing valve and an auxiliary or pilot valve of which the auxiliary valve is moved mechanically, and the main distributing valve, after it has been placed in equilibrium owing to the movement of the auxiliary valve, is also moved mechanically for a certain portion of its stroke completion of its stroke being effected by steam under the control of the auxiliary valve.

Now according to the present invention both the main and the auxiliary valves are of the piston type and the final movements of the main valve are effected by steam acting directly on its ends. The construction and arrangement of the distributing means is such that the auxiliary valve, which is actuated from the engine piston through suitable mechanism, is adapted by such movement to move the main valve to its mid position and to control steam supply and exhaust ports and passages in such manner as before moving the main valve to place said valve in equilibrium by allowing steam to act on its opposite ends, and as while moving the main valve, to release steam from the end toward which it is being moved so that the steam acting on its other end will complete its movement thereby considerably reducing the wear and tear of the external parts of the valve gear.

Referring to the accompanying drawings, Figure 1 is a central longitudinal section illustrating one arrangement of main distributing valve with auxiliary valve according to this invention.

Fig. 2 is a similar view but with parts in different positions.

Fig. 3 shows in elevation the two valves removed from the valve casing; and Fig. 4 is a transverse section through the valves.

Figs. 5 to 9 illustrate a modified construction, Figs. 5 and 6 being longitudinal sections on the lines A B C and A B D, Fig. 7. Fig. 7 a cross section on the line E F Fig. 5, and Figs. 8 and 9 detail views hereinafter referred to.

Figs. 10 and 11 are longitudinal sections illustrating another modification.

Fig. 12 is an enlarged view of Fig. 1 and Fig. 13 is a section on the line X X Fig. 12.

In this arrangement, a cylindrical steam chest 1 with steam inlet and exhaust branches 2 and 3 is fitted with a liner 4, the steam inlet being connected by a passage 5 with steam inlet ports 6, $6^a$ to the valve chest disposed near but not at the ends thereof, other ports 7, $7^a$ in the valve chest between said inlet ports communicating through a passage 8 with the exhaust and others 9 and 10, between the inlet and exhaust ports 6, 7 and $6^a$ and $7^a$ at each end, with the engine cylinder, through passages $9^a$ and $10^a$. 11 is the main valve and 12 the auxiliary valve both reciprocating in the liner. The main valve 11 is in the form of a long piston with an annular chamber or port $11^a$ near each end, and with a slot $11^b$ in the middle to receive the auxiliary valve 12 which is in the form of a piston with two flats to suit the slot in the main valve (see Figs. 3 and 4). Pairs of ports 13 and 14 are formed in the opposite sides of the auxiliary valve and communication or balance passages 15 connect the opposite ports of each pair.

The auxiliary valve spindle 16 extends through the end of the steam chest for actuation from the engine piston through a lever arrangement which is not shown as it is well understood.

Various controlling ports and passages are situated at the back of the liner.

At one side there are passages 17 and 18 communicating through ports $17^a$ and $18^a$ with the respective ends of the valve chest and extending toward its center, where each communicates through a pair of ports $17^b$, $17^c$ and $18^b$, $18^c$ with the valve chest the two pairs of ports being so disposed longitudinally of the valve chest that one of each pair of said ports will be in communication with the respective ports 13 and 14 in the corresponding side of the auxiliary valve when said valve is in its extreme positions, but that as the auxiliary valve moves from one extreme position to the other the pairs of ports in the liner will be temporarily closed successively. At the other side of the valve chest liner, near its center are four ports 19, 20, 21 and 22 the middle two, 20 and 21, communicating through a passage 23 with the steam inlet port 6 in the liner and the two outer ones 19 and 22 respectively communicating through separate passages 24 and 25 in the liner with the exhaust ports 7 and 7$^a$ toward the corresponding ends thereof by way of ports 24$^a$ and 25$^a$. The distance between the two middle ports 20 and 21 is greater than that between the two middle ports 17$^b$ and 18$^b$.

As the area of the valve spindle 16 is exposed to steam pressure, the spindle is connected by a lever 26 to a balancing piston 27 contained in a cylinder 28 connected with the steam chest by a passage 29 and a port 29$^a$ in the liner, so that the exposed spindle is balanced under all conditions and any possibility of the auxiliary valve spindle dropping when the steam chest is used in the vertical position prevented.

Assuming the main valve 11 to be at one end of the steam chest in Fig. 1 the lower end, so that steam passes through the chamber or port 11$^a$ near its one end from the inlet port 6$^a$ at that end of the chest to the engine cylinder through the port 10 and passage 10$^a$, and from the engine cylinder through the passage 9$^a$, port 9 and the other chamber or port 11$^a$ of the valve to the exhaust port 7 at that end of the chest, the engine piston is moved toward one end of the engine cylinder and as the piston approaches the end of its stroke, the lever arrangement (not shown) that is operated by the piston rod crosshead engages the valve spindle 16 and commences to move the auxiliary valve 12 in the same direction as the engine piston. The first movement of this valve 12 closes the exhaust port 22 through which the lower end of the valve chest, to which the main valve had been previously moved, had been in communication with the exhaust 3 by way of the port 18$^a$, passage 18, port 18$^c$, ports 14, passages 15 and the passage 25, ports 25$^a$ and 7$^a$ and the passage 8. The further movement of the auxiliary valve then causes steam to be admitted to the lower end of the valve chest through the port 21 (which obtains steam through the port 6 and passage 23) ports and passages 14 and 15, port 18$^c$, passage 18 and port 18$^a$, and simultaneously again places the upper end of the valve 11 in communication with the steam supply by way of port 6, passage 23, ports 20, ports 13 and passage 15, port 17$^c$, passage 17 and port 17$^a$; the main valve will be thus placed in equilibrium, the steam by which its final movement was effected not having been released from its upper end though the steam supply thereto had been temporarily cut off by the valve 12. The auxiliary valve 12 will then have arrived at the end of the slot 11$^b$ in the main valve 11 and its further movement carries the main valve forward with it until the said valve is in mid position, as shown in Fig. 2 when the engine cylinder will be closed to both steam and exhaust. During the time that the engine cylinder is thus being closed the auxiliary valve 12 is closing to steam that end of the valve chest toward which it is traveling by closing the port 20 and by the time the main valve 11 is in mid position, the auxiliary valve 12 has opened the port 19 thus opening to exhaust the upper end of the valve chest by way of port 17$^a$, passage 17, port 17$^c$, ports 13 and passages 15, port 19, passage 24, ports 24$^a$ and 7 and passage 8 with the result that the movement of the main valve is completed by means of the steam still acting on its opposite lower end. The engine piston will then make its return stroke owing to the release of the steam which has moved the engine piston by way of the passage 10$^a$, port 10, lower chamber or port 11$^a$, port 7$^a$ and passage 8 and the admission of steam to the other end of the engine cylinder from the port 6 through the upper chamber or port 11$^a$, the port 9 and passage 9$^a$. During its return stroke the piston will operate the lever arrangement of the valve spindle 16 in the opposite direction and the distributing means will be actuated in a similar manner to that just described but in the opposite direction.

In the arrangement shown in Figs. 5 to 9, instead of the auxiliary valve being formed with flats and sliding in a slot in the main piston valve, it is of completely circular cross section and the main piston valve is in two parts connected together by spindles or legs on which the auxiliary valve is threaded so as to slide between the two parts of the main valve. The two parts 11, 11$^x$ of the main valve are held at the required distance apart by two shouldered spindles 11$^c$ which are formed with heads 11$^d$ that enter slots 11$^e$ in the parts 11, 11$^x$ through enlarged portions of said slots (see Fig. 8) and when moved laterally engage with said parts; the auxiliary valve 12 is formed with longitudinal passages 12$^a$ through which the spindles 11$^c$ extend. The spindles and the valve parts having been assembled the spindle 16 is passed up through the valve part 11$^x$ and the valve 12 and its prolonged upper end screwed through a nut 40 contained in a recess in the valve 12 until the latter is firmly secured on the spindle 16, the prolonged end of which enters a central recess in the part 11 as shown.

The ports and passages are arranged in substantially the same manner as in the previously described arrangement except that the chambers or ports 13 and 14 in the auxiliary valve 12 being in the form of peripheral grooves, connecting passages 15 are not required; the working of the parts is the same.

To insure proper balancing of both valves, where ports open into the liner internal annular grooves are formed in same, as clearly shown in Figs. 5 and 6.

Each of the exhaust passages 24, 25 in the liner may be fitted with a plug or bolt valve 41 as shown in Fig. 9. By adjusting these valves the areas of the passages can be adjusted and velocity of the movements of the main valve 11 by means of steam acting on its ends thus regulated.

In the alternative arrangement shown in Figs. 10 and 11, the main and auxiliary valves work in separate chambers which may be side by side and the auxiliary valve spindle be coupled to a spindle extending into the body of the main valve but between which and said valve there is a certain amount of lost motion to enable the auxiliary valve to effect the desired distribution of steam to place the main valve in equilibrium before it is moved mechanically.

Fig. 10 shows the auxiliary valve in its upper position and the main valve at that point in its downward stroke when it ceases to be moved mechanically, while Fig. 11 shows the auxiliary valve in the same position but with the down stroke of the main valve completed by steam acting on its upper end; in Fig. 10 the steam inlet is indicated by dotted lines and in Fig. 11 the exhaust, these being on opposite sides of the plane of the sections. The valves are both piston valves as in the just described arrangement and the spindle 16 of the auxiliary valve 12 is coupled through the lever 26 with a spindle $16^a$ that extends into the separate cylindrical chamber $1^a$ of the steam chest containing the main valve 11 and formed with the ports 6 and $6^a$ that are connected to the steam inlet branch 2 by the passage 5, with exhaust ports 7 and $7^a$ connected to the exhaust branch 3 by the passage, and with ports 9 and 10 connected to the respective ends of the engine cylinder by way of passages $9^a$ and $10^a$.

The spindle $16^a$ is formed with a head that is held in a recess 42 in the main valve 11 by a bored plug 43 so as to permit of the necessary lost motion between the two valves.

Ports and passages are arranged in a manner corresponding to those in the arrangements previously described and are marked with the same reference numbers, and it will be observed that as the valves 11 and 12 move in opposite directions the passages 17 and 18 cross each other, the ports $17^b$, $17^c$ being below the middle length of the valve chest and the ports $18^b$ $18^c$ above while the arrangement of the ports 19, 20, 21 and 22 is reversed end for end. The ports 20, 21 are in communication with the steam supply by way of a lateral passage $5^a$ and the ports 19 and 22 with the exhaust by a lateral passage $8^a$. With this arrangement of coupled valves, a balance piston such as shown in the previously described arrangements is not required.

The arrangements referred to are specially suitable for use with superheated steam and are described by way of example only as they may be variously modified.

The invention is applicable to direct acting steam pumps, hauling engines, towing engines, rendering engines or any other type of direct acting steam engines and by suitably arranging the ports and gear of the distributing means steam can be cut off at any part of the stroke and used expansively.

What I claim is:—

1. Means for distributing actuating fluid in engines of the kind referred to comprising a chest having a steam inlet passage, steam admission passages to the engine and steam exhaust passages, a main piston valve endwise movable within said chest and controlling said steam admission and exhaust passages, a liner fitted in said chest and having two pairs of ports ($17^b$, $17^c$ and $18^b$, $18^c$) which respectively communicate with spaces at opposite ends of the main valve, a pair of ports (20, 21) in communication with the steam supply and, nearer the ends of the liner than said pair of ports (20, 21), two ports (19 and 22) communicating respectively through separate passages with the exhaust, the longitudinal distance between the ports (20 and 21) of the single pair being greater than the distance between the adjacent ports ($17^b$, $18^b$) of the two pairs of ports ($17^b$, $17^c$ and $18^b$, $18^c$) an auxiliary valve endwise movable in said liner and formed with ports (13 and 14), and means, directly connected with the auxiliary valve and through a lost motion connection with the main valve, for imparting movement thereto from the engine piston, the arrangement being such that one of each pair of the ports ($17^b$, $17^c$ and $18^b$, $18^c$) will be in communication with the respective ports (13 and 14) in the auxiliary valve, when the latter is in either extreme position, the ports in the said valve in that position respectively communicating with the steam supply and exhaust, substantially as described.

2. Means for distributing actuating fluid in engines of the kind referred to comprising a cylindrical steam chest having a steam inlet passage, steam admission passages to the engine and steam exhaust passages, a liner fitted in said chest having ports communicating respectively with said steam inlet, admission and exhaust passages, a main piston valve endwise movable in said liner and controlling said steam admission and exhaust ports, in said liner two pairs of ports ($17^b$, $17^c$ and $18^b$, $18^c$) which respectively communicate with spaces at opposite ends of the main valve, a pair of ports (20, 21) in communication with the steam supply and, nearer the ends of the liner than said pair of ports (20, 21), two ports (19 and 22) communicating respectively through separate passages with the exhaust, the longitudinal distance between the ports (20 and 21) of the single pair being greater than the distance between the adjacent ports (17$^b$, 18$^b$) of the two pairs of ports (17$^b$, 17$^c$, and 18$^b$, 18$^c$) an auxiliary valve endwise movable in said liner and formed with ports (13 and 14), and means, directly connected with the auxiliary valve and through a lost motion connection with the main valve, for imparting movement thereto from the engine piston, the arrangement being such that one of each pair of the ports (17$^b$, 17$^c$, and 18$^b$, 18$^c$) will be in communication with the respective ports (13 and 14) in the auxiliary valve, when the latter is in either extreme position, the ports in the said valve in that position respectively communicating with the steam supply and exhaust, substantially as described.

3. Means for distributing actuating fluid in engines of the kind referred to comprising a cylindrical steam chest having a steam inlet port near each end, exhaust ports between said inlet ports, and between the inlet and exhaust ports toward each end an admission port to the engine, a liner fitted in said chest and having ports therethrough to the said inlet, exhaust and admission ports; a main valve constituted by two connected pistons each having an annular port, said valve being endwise movable in said liner to control said inlet, admission and exhaust liner ports, in said liner two pairs of ports (17$^b$, 17$^c$, and 18$^b$, 18$^c$) which respectively communicate with spaces at opposite ends of the main valve, a pair of ports (20, 21) in communication with the steam supply and, nearer the ends of the liner than said pair of ports (20, 21), two ports (19 and 22) communicating respectively through separate passages with the exhaust, the longitudinal distance between the ports (20 and 21) of the single pair being greater than the distance between the adjacent ports (17$^b$, 18$^b$) of the two pairs of ports (17$^b$, 17$^c$, and 18$^b$, 18$^c$), an auxiliary valve endwise movable in said liner and, to a limited extent, between the pistons of the main valve, and means directly connected to the auxiliary valve for imparting movement to it and ultimately to the main valve from the engine piston, the arrangement being such that one of each pair of the liner ports (17$^b$, 17$^c$, and 18$^b$, 18$^c$) will be in communication with the respective ports (13 and 14) in the auxiliary valve, when the latter is in either extreme position, the ports in the said valve in that position respectively communicating with the steam supply and exhaust, substantially as described.

4. Means for distributing actuating fluid in engines of the kind referred to, comprising a chest having a steam inlet passage, steam admission passages to the engine and steam exhaust passages, a main piston valve endwise movable within said chest and controlling said steam admission and exhaust passages, a liner fitted in said chest and having two pairs of ports (17$^b$, 17$^c$ and 18$^b$, 18$^c$) which respectively communicate with spaces at opposite ends of the main valve, a pair of ports (20, 21) in communication with the steam supply and, nearer the ends of the liner than said pair of ports (20, 21), two ports (19 and 22) communicating respectively through separate passages with the exhaust, the longitudinal distance between the ports (20 and 21) of the single pair being greater than the distance between the adjacent ports (17$^b$, 18$^b$) of the two pairs of ports (17$^b$, 17$^c$ and 18$^b$, 18$^c$), an auxiliary valve endwise movable in said liner and formed with ports (13 and 14), and means, directly connected with the auxiliary valve and through a lost motion connection with the main valve, for imparting movement thereto from the engine piston, auxiliary valve balancing means constituted by a piston and cylinder connected to one of the steam chests, the arrangement being such that one of each pair of the ports (17$^b$, 17$^c$ and 18$^b$, 18$^c$) will be in communication with the respective ports (13 and 14) in the auxiliary valve, when the latter is in either extreme position, the ports in the said valve in that position respectively communicating with the steam supply and exhaust, substantially as described.

Signed at Gateshead in the county of Durham, England, this 12th day of September, 1917.

WILLIAM ARMSTRONG WOODESON.

Witnesses:
ERNEST J. ADAMSON,
COLIN C. STOBBS,